US005768033A

United States Patent [19]
Brock

[11] Patent Number: 5,768,033
[45] Date of Patent: Jun. 16, 1998

[54] MICROSCOPE ASSEMBLY COMPRISING A SUPPORTED AND MOVABLE SPECIMEN WHEEL AND FINE ADJUSTMENT MEANS

[76] Inventor: Dennis Brock, 1430 Pelican Bay Trail, Winter Park, Fla. 32792

[21] Appl. No.: 663,498

[22] Filed: Jun. 14, 1996

[51] Int. Cl.$^6$ .................................................. G02B 7/02
[52] U.S. Cl. ........................................ 359/813; 359/821
[58] Field of Search ............................. 359/813, 821, 359/368, 389, 390, 391, 393, 394, 822

[56] References Cited

U.S. PATENT DOCUMENTS

| 3,575,486 | 4/1971 | de Posada | 359/393 |
| 3,625,586 | 12/1971 | Olexa | 359/393 |
| 3,749,481 | 7/1973 | Bosack | 351/214 |
| 3,762,798 | 10/1973 | Grubb et al. | 359/394 |
| 4,589,741 | 5/1986 | Clegg | 359/394 |
| 4,779,967 | 10/1988 | Murphy | 359/379 |
| 4,784,481 | 11/1988 | Wuerfel | 359/391 |
| 5,029,996 | 7/1991 | Carter | 359/369 |
| 5,071,241 | 12/1991 | Brock | 359/390 |
| 5,103,338 | 4/1992 | Crowley et al. | 359/394 |
| 5,214,538 | 5/1993 | Lobb | 359/691 |
| 5,367,401 | 11/1994 | Saulietis | 359/398 |
| 5,371,624 | 12/1994 | Nagano | 359/389 |

FOREIGN PATENT DOCUMENTS

| 5-297282 | 11/1993 | Japan | 359/394 |
| 3092 | of 1906 | United Kingdom | 359/394 |

*Primary Examiner*—David C. Nelms
*Assistant Examiner*—Ricky Mack
*Attorney, Agent, or Firm*—Caesar, Rivise, Bernstein, Cohen & Pokotilow, Ltd.

[57] ABSTRACT

An assembly of a microscope, a multi-specimen holder, and a display stand. The microscope includes an optical tube, a stage having an aperture therein, and a light transmissive rod having an ambient light gathering end portion located below the stage and arranged to receive ambient light to convey it through the aperture to illuminate a specimen located above the stage. The microscope is mounted on the display stand, as is the specimen holder. The specimen holder is a rotatable wheel having plural specimen holding portions and at least one light transmissive opening associated therewith. The specimen holder is supported by plural shock absorbing pads. The specimen holder is arranged to be manually rotated to bring any of the specimens into the microscope's field of view. The at least one opening in the specimen holder enables ambient light to pass therethrough to the light gathering end of the light transmissive rod. The display stand includes a base member upon which the microscope and the specimen holder are mounted, and an upstanding display portion for displaying indicia, e.g., point-of-sale information, instructional information, etc., thereon.

21 Claims, 4 Drawing Sheets

MICROSCOPE ASSEMBLY COMPRISING A SUPPORTED AND MOVABLE SPECIMEN WHEEL AND FINE ADJUSTMENT MEANS

BACKGROUND OF THE INVENTION

This invention relates generally to microscopes, and more particularly to microscopes with specimen supports for holding plural specimens and for illuminating the same.

The United States patent literature includes many microscopes and specimen holders for permitting the examination of a plurality of specimens. For example, U.S. Pat. No. 3,625,586 (Olexa) discloses a linearly and rotationally adjustable multi-slide stage for a microscope, which includes an opening or perforation to enable light to pass therethrough and on which plural pie-shaped specimen slides are disposed.

U.S. Pat. No. 3,762,798 (Grubb et al.) discloses a conventional microscope having a stage on which a supplementary stage is mounted. The supplementary stage includes a transparent stage plate with a pair of upstanding pivot pins and is arranged to mount a rotatable specimen plate thereon. The specimen plate includes a plurality of annularly-arranged spaces for holding specimens therein to be selectively brought into the field of the microscope.

U.S. Pat. No. 5,029,996 (Carter) discloses a sophisticated microscope viewing system adapted for exhibition use.

U.S. Pat. No. 4,589,741 (Clegg) discloses a microscope stage having a plurality of compartments for specimens, and which stage is arranged to be revolved and moved linearly simultaneously by turning a single knob.

Other patents disclosing microscopes having plural specimen holders are: U.S. Pat. Nos. 4,784,481 (Wuerfel) 5,103,338 (Crowley et al.), and 5,367,401 (Saulietis).

While the aforementioned microscopes appear suitable for their intended purposes, they leave much to be desired from the standpoint of suitability for use by young students or children. In this regard owing to the budgetary constraints of most schools sophisticated, laboratory-quality microscopes, like those disclosed above, are not generally used in classroom settings. Another factor limiting the use of sophisticated microscopes by young students is their inability to readily operate the instrument, e.g., focus it, adjust the illumination, etc., and/or to readily change specimens to be viewed. Moreover, rough handling of the microscope may be expected, particularly with very young children.

Accordingly, for typical classroom use by young children low cost, simple, rugged and easy-to-use microscopes are desirable. One such microscope is that sold under the trademark MAGISCOPE and is disclosed in my earlier U.S. Pat. No. 5,071,241, whose disclosure is incorporated by reference herein.

While that microscope is suitable for its purposes it still leaves something to be desired from the standpoint of providing easy specimen changing.

OBJECTS OF THE INVENTION

Accordingly, it is a general object of this invention to provide a microscope assembly which overcomes the disadvantages of the prior art.

It is another object of this invention to provide a microscope assembly which enables the easy selection of any of a multiplicity of specimens for viewing.

It is another object of this invention to provide a microscope assembly including a specimen holder permitting the selection of any of a multiplicity of specimens for viewing and which is simple in construction.

It is another object of this invention to provide a microscope assembly including a specimen holder permitting the selection of any of a multiplicity of specimens for viewing and which is rugged.

It is still another object of this invention to provide a an microscope assembly making use of ambient illumination which includes a specimen holder permitting the selection of any of a multiplicity of specimens for viewing and which does not interfere with the ambient illumination.

It is yet another object of this invention to provide a an microscope assembly includes a specimen holder permitting the selection of any of a multiplicity of specimens for viewing and an associated display panel with indicia thereon, thereby rendering the assembly suitable for point-of-sale use, or as part of a science display or exhibition, or for classroom use.

It is yet another object of this invention to provide a microscope assembly having a tamper-proof specimen holder for holding a plurality of specimens therein for selective viewing thereof.

SUMMARY OF THE INVENTION

These and other objects of this invention are achieved by providing a microscope assembly comprising a microscope, a specimen holder, and a display stand.

In accordance with one aspect of this invention the microscope comprises an optical tube, a stage having an aperture therein, and a light transmissive rod having an ambient light gathering end portion located below the stage and arranged to receive ambient light and convey it through the aperture to the optical tube.

The specimen holder comprises a movable, e.g., rotatable, member having plural specimen holding portions and at least one light transmissive window associated with the specimen holding portions. The holder is located adjacent the microscope and arranged to have selected ones of the specimen holding portions disposed over the aperture and with the at least one window in the holder enabling ambient light from above the holder to pass therethrough to the ambient light gathering end of the light transmissive rod.

In accordance with another aspect of this invention the ambient light gathering end of the light transmissive rod is sanded to be slightly roughened to expedite the illumination of the specimens at low magnifications. A microscope so constructed need not form a part of an assembly including a specimen holder and/or a display stand.

In accordance with another aspect of this invention the microscope includes an optical tube, a stage having an aperture therein, a support sleeve, and a lighting member arranged to convey light through the aperture to the optical tube. The optical tube is slidably mounted within the support sleeve to adjust the spacing between it and the microscope stage. The support sleeve has an inclined cam surface extending along a portion of an edge thereof. The optical tube has a cam follower projecting from the outer surface of it and which is arranged to ride on the cam surface to effect the fine positioning of the optical tube with respect to the stage. The microscope so constructed need not form a part of an assembly including a specimen holder and/or a display stand.

In accordance with another aspect of this invention the specimen holder need not include the light transmissive window, and the microscope need not include the light transmissive rod, but the specimen holder does include means for supporting it at a desired position with respect to the microscope stage, irrespective of rough handling of the specimen holder. In such an arrangement the specimen holder comprises a movable member having plural specimen holding portions arranged to be selectably positioned over the microscope stage. The specimen holder comprises support means, e.g., shock absorbing pads, for supporting plural peripheral portions of it at spaced positions thereon. One of the positions is adjacent the microscope stage and another of the positions is remote from the microscope stage.

In accordance with another aspect of this invention the display stand is arranged to support the microscope and the specimen holder thereon and to provide a visible indicia display, e.g., point of sale advertising and/or instructional material. The display stand basically comprises a base member upon which the microscope and the specimen holder are mounted and an upstanding display portion for displaying the indicia. The indicia may be provided on a card or panel releasably mounted on the display portion of the display stand.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
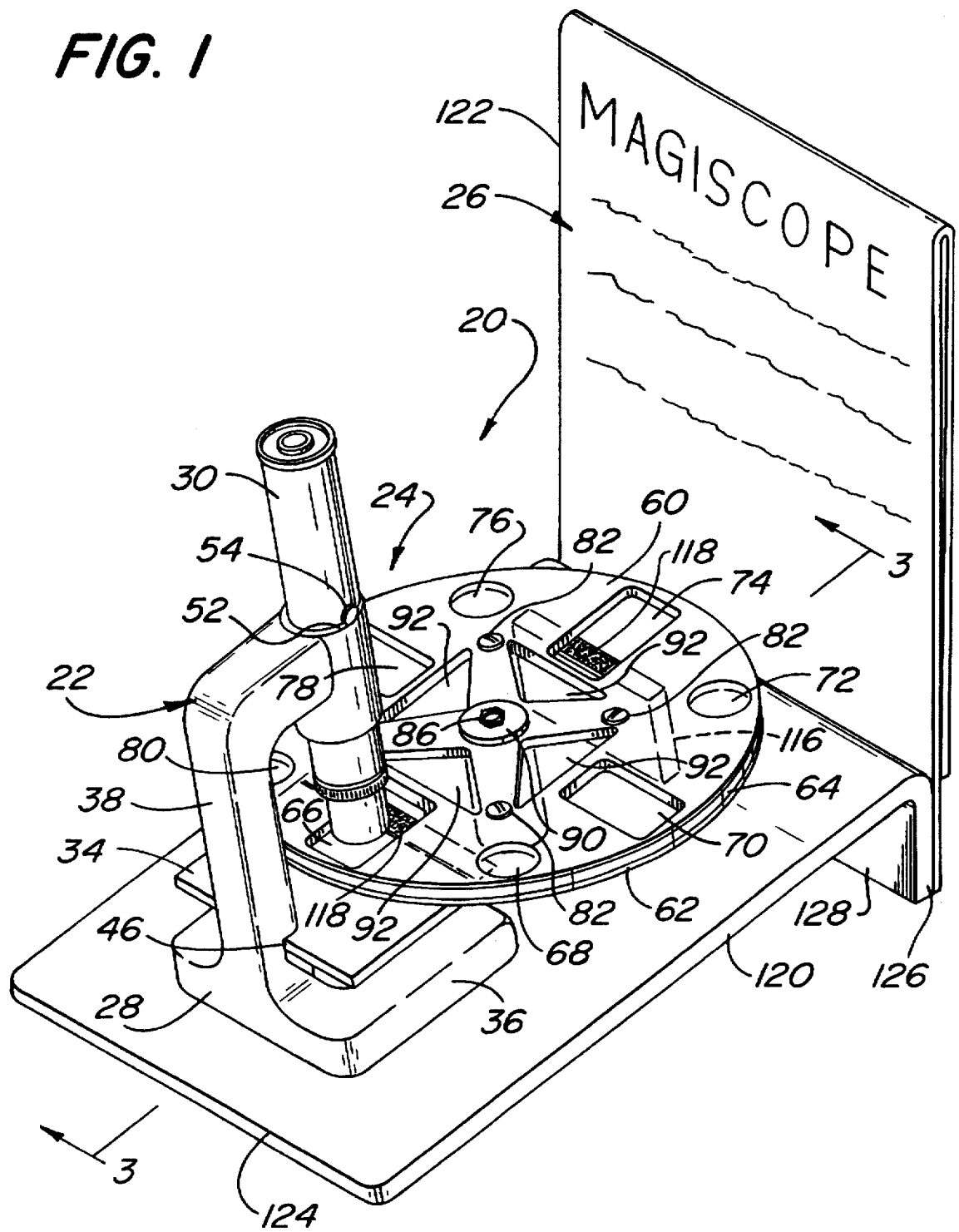
FIG. 1 is an isometric view of a microscope assembly constructed in accordance with this invention.

Referring now to various figures of the drawing where like reference numerals refer to like parts there is shown at 20 in FIG. 1 a microscope assembly constructed in accordance with this invention.

The assembly 20 basically comprises a microscope 22, a specimen holder 24, and a display stand 26. The microscope is constructed in accordance with the teachings of my U.S. Pat. No. 5,071,241, except for two features to be described later. Thus, the microscope 22 basically comprises a support or stand 28, an optical tube 30, and an illuminating light transmissive rod 32 (FIG. 3), and a stage 34. The stand 28 comprises of a lower, horizontal leg section 36, an upstanding vertical arm 38 and an in-turned upper leg section 40. The upper leg section is secured at its free end to a resilient, cylindrical split sleeve 42. The sleeve 42 is arranged for slidably supporting the optical tube 30 therein, with the friction therebetween being sufficient to maintain the optical tube in any of its various adjusted positions, so that the optical tube can be brought into focus on any specimen located on the stage. The stage is a generally planar member having an aperture (not shown) therein. The stage is bonded or frictionally secured within a slot or groove 46 in the vertical arm 38.

Figures 3, 6:
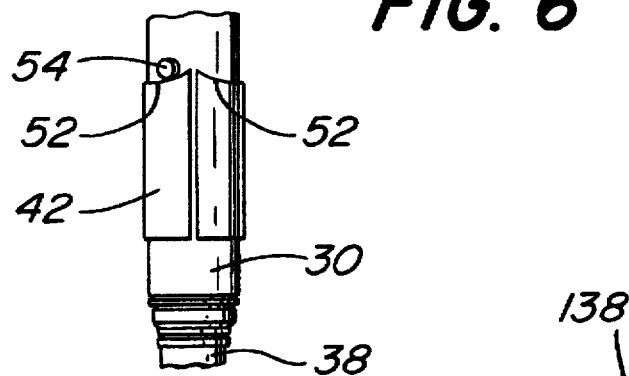
FIG. 3 is an enlarged sectional view taken along line 3—3 of FIG. 1.
FIG. 6 is a front view of a portion of the microscope taken along line 6—6 of FIG. 3.

The light transmissive rod 32 is in the form of a transparent, clear, curved acrylic member attached at one end thereof within a passageway (not shown) of a clear, flat, acrylic plate 48 (FIG. 3), by a suitable solvent binder. The passageway is aligned with the aperture in the microscope stage 34. The end of the rod is located close to the aperture and is planar. The opposite or free end 50 of the rod 32 is also planar and serves as the ambient light receiving portion of the rod 32. As can be seen in FIG. 3 the free end 50 of the rod 32 is located so that it is below the microscope's stage 34 and directed at an acute angle, e.g., 50 degrees, from the horizontal, upward to gather ambient light from above and carry it through the aperture in the microscope stage to illuminate any specimen disposed over the aperture. The plate 48 is preferably formed of a transparent, clear acrylic whose edges are polished so that it gather ambient light and coveys it to the rod 32, which in turn conveys it to the aperture 44. The light gathering ability of the rod and associated plate is such as to enable sufficient illumination to permit high magnification, e.g., 400× and possibly greater, suitable for use in an educational environment.

In accordance with a preferred aspect of this invention the light gathering free end surface 50 is matted or roughened by sanding it with a 320 grit sandpaper. This provides for more even illumination of the specimen in environments having uneven or other lighting anomalies, such as frequently occurs in exhibition halls using high intensity lighting, such as halogen, sodium vapor, metal halide, etc. Conventional fluorescent lighting typically is free of such anomalies and hence microscopes for use in such conditions may use a light transmissive rod with a polished light gathering end surface 50. The end of the rod 32 which is attached to the plate 48 is preferably matted to diffuse or even out the light transmitted through the rod 32 to the aperture in microscope's stage 44.

Focusing of the microscope on a specimen disposed over the aperture in the stage is accomplished by sliding the optical tube to or fro within the split sleeve 42. In accordance with one preferred aspect of this invention the microscope includes means for effecting the fine adjustment or focussing of the optical tube with respect to the microscope stage. That means is shown clearly in FIGS. 3 and 6 and basically comprises a pair of inclined cam surfaces 52, and a cam follower or pin 54. The cam surfaces are formed on the upper edge of the split sleeve 42 contiguous with the split in the sleeve and each extend upward at a slight incline. The cam follower 54 is secured to the outer surface of the optical tube and is arranged to be brought into engagement with either edge surface 52 by sliding the optical tube 30 downward toward the microscope stage 34 to grossly focus the microscope, and then by rotating the optical tube about its longitudinal axis so that the cam follower slides along the engaged inclined cam surface, either up or down (as the case may be), to effect the fine focussing of the microscope.

The microscope 20 is arranged to be used to examine plural specimens supported in the specimen holder 24. The specimen holder 24 is a tamper-proof member in the form of a rotatable disk or wheel 58 having plural specimen holding compartments (to be described later) each of which is arranged to hold a respective specimen for examination therein. The holder 24 is mounted in front of the microscope on a portion of the display stand (to be described later) so that each specimen holding compartment can be selectively positioned over the aperture in the microscope's stage for examination. As will also be described in detail later the rotatable disk includes plural transparent clear windows through which ambient light from above can pass unimpeded to be picked up or gathered by light gathering end 50 the light transmissive rod 32 for illuminating the specimen over the microscope stage's aperture. The windows in the holder are arranged so that irrespective of which specimen holding compartment is located over the stage's aperture, ambient light from above the holder will be permitted to pass through a window unimpeded for collection by the light transmissive rod.

The specimen holder wheel 58 basically comprises three circular disks or plates, namely, an upper plate 60, a lower plate 62 which are held spaced apart from each other by an intermediate plate 64. The plates 60 and 62 are preferably transparent clear acrylic of approximately ⅛ inch (3.18 mm) thick for reasons to be apparent later. The intermediate plate 64 is also acrylic, but is preferably colored in the interest of aesthetics.

Figure 2:
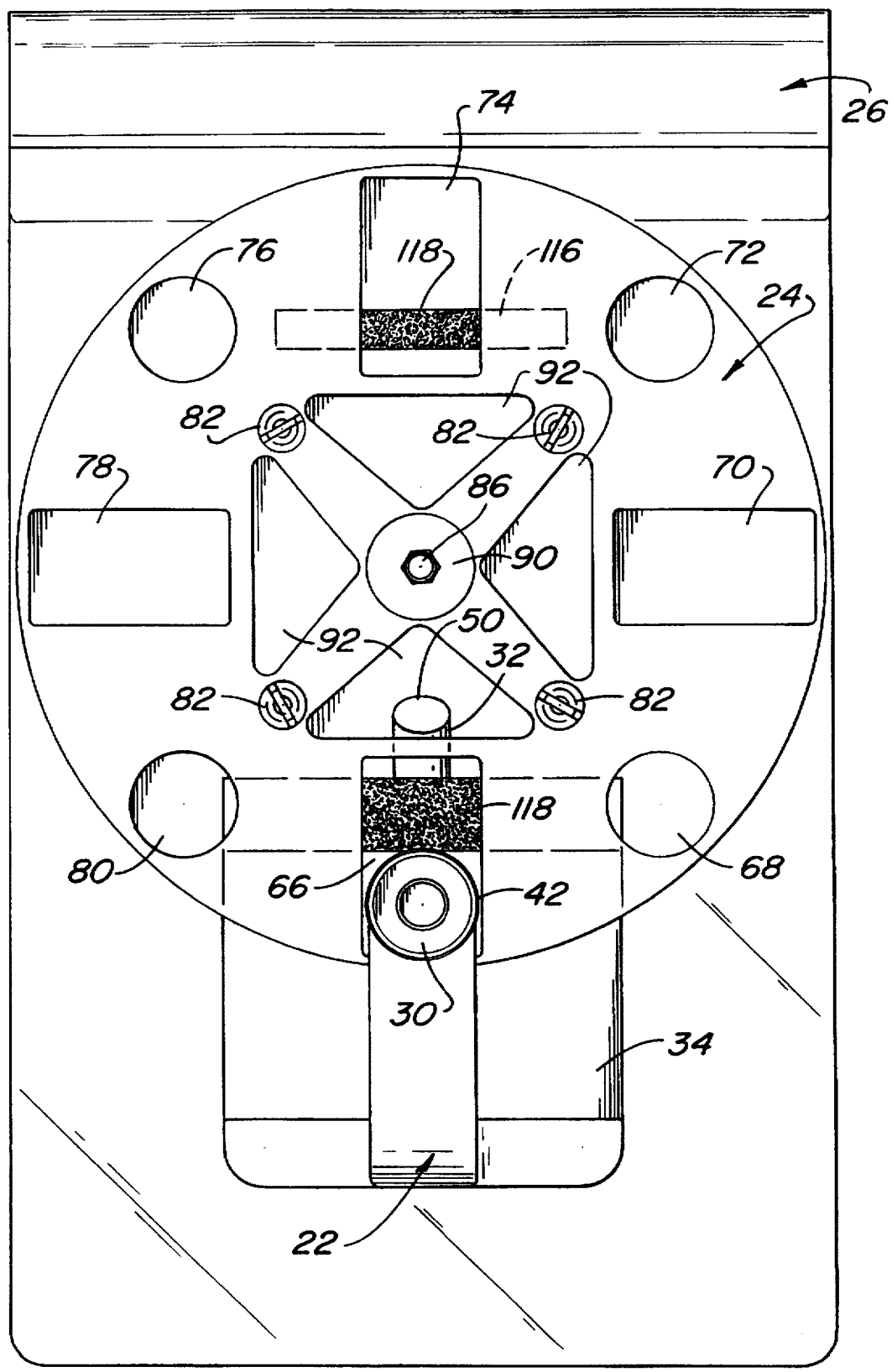
FIG. 2 is an enlarged top plan view of the microscope assembly shown in FIG. 1.

In the embodiment of the specimen holder 24 shown in FIGS. 1–3 there are eight, sealed, specimen holding compartments, 66, 68, 70, 72, 74, 76, 78 and 80. The compartments 66, 70, 74 and 78 are formed by rectangular openings in the intermediate plate 60 between the top and bottom plate, while the compartments 68, 72, 76 and 80 are formed by circular openings in the intermediate plate between the top and bottom plate. The rectangular compartments and the round compartments are interleaved with each other and are equidistantly spaced adjacent the outer edge or periphery of the specimen holder wheel. Respective specimens, such as insects 44 (FIG. 3), are arranged to be inserted within each compartment in the intermediate plate and then the top and bottom plates are secured thereto to seal the specimens in the compartments and to make the specimen holder tamper-proof. The means for securing the plates together comprise plural screws 82.

The specimen holder wheel 58 is mounted on an upstanding post or spindle 84, which is in turn mounted on the display stand (to be described later). In particular, a threaded screw 86 extends through axially aligned central holes in the plates 60, 62 and 64 for threaded engagement within a threaded bore 88 in the spindle. A pair of washers 90 are interposed between the head of the screw 86 and the top plate 60.

As mentioned earlier the specimen holder includes plural transparent windows to enable ambient light to pass therethrough to reach the light transmissive rod 32. In the embodiment of the specimen holder wheel 58 of FIG. 1 there are four such windows 92. The windows 92 are each triangular in shape and are formed by openings in the intermediate plate, with each radially aligned with a respective rectangular specimen holding compartment. Thus, each window is defined by the portions of the top and bottom plates as bounded by the triangular opening in the intermediate plate. Since those portions of the plates are clear, transparent and sufficiently thin, light can pass therethrough substantially unattenuated.

As should be appreciated by those skilled in the art whenever any specimen holding compartment 66, 70, 74 and 78 is aligned with the aperture in the microscope stage, an associated window 92 in the specimen holding wheel 58 will be located over the light gathering end 52 of the light transmissive rod 32. Accordingly, ambient light from above the specimen holder will reach the rod unimpeded for illuminating the specimen holding compartment from below.

The four round specimen holding compartments 68, 72, 76 and 80 are arranged for holding specimens that do not require as much illumination from below as do the specimens in the compartments 66, 70, 74 and 78. Examples of specimens not requiring a lot of illumination from below are coins, rocks, or other opaque specimens. Thus, the specimen holder wheel 58 does not include any light transmissive windows associated with these compartments.

Figure 4:
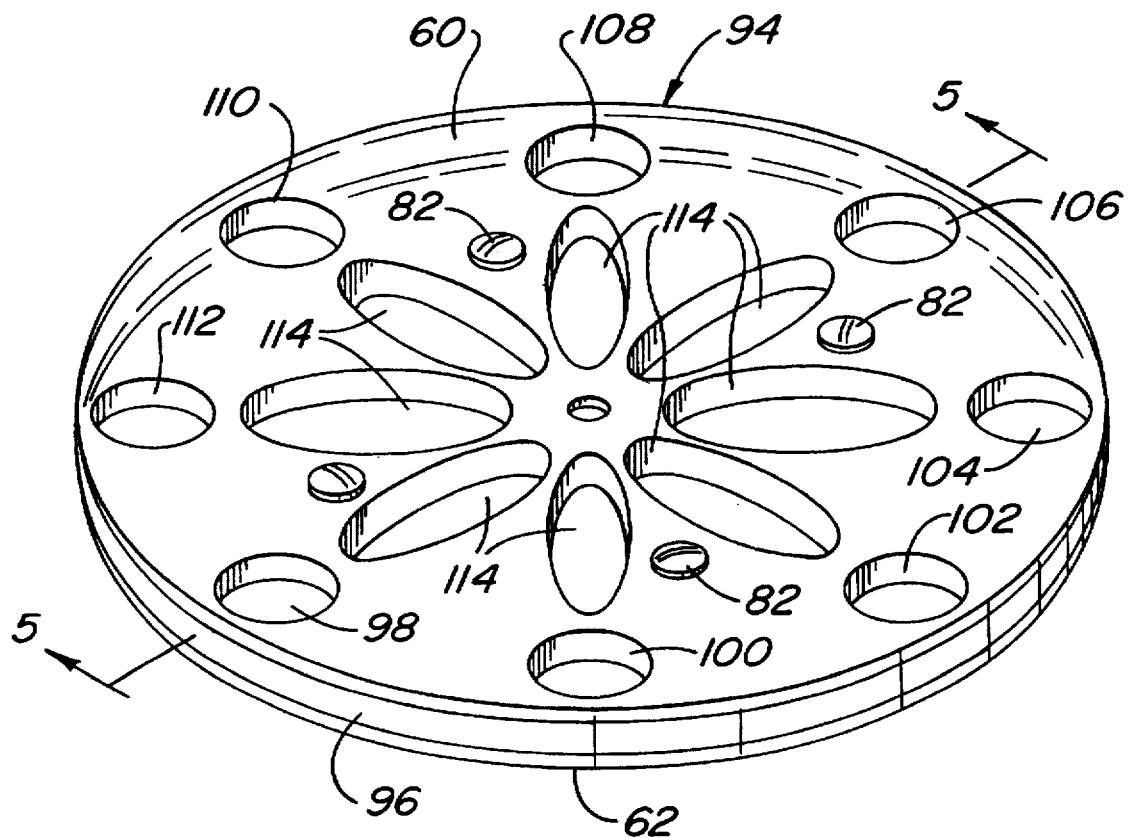
FIG. 4 is an enlarged isometric view of an alternative embodiment of a specimen holder forming a portion of the microscope assembly shown in FIG. 1.
Figure 5:
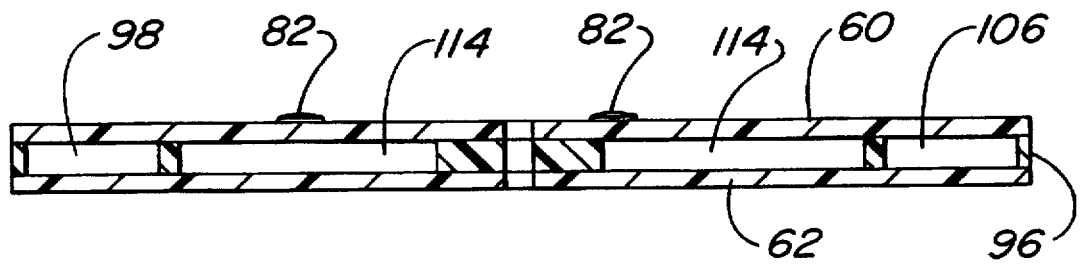
FIG. 5 is a sectional view taken along line 5—5 of FIG. 4.

In FIGS. 4 and 5 there is shown an alternative embodiment of a specimen holding wheel constructed in accordance with this invention. That wheel is designated by the reference number 94 and is identical to the wheel 58 except for the construction of the intermediate plate thereof. Thus, in the interests of brevity the common components of the specimen holding wheels 58 and 94 will be given the same reference numbers and their construction and arrangement will not be reiterated herein.

The specimen holding wheel 94 includes an intermediate plate 96 similar to plate 64 but including eight, circular openings 98, 100, 102, 104, 106, 108, 110 and 112 defining respective specimen holding compartments. Each compartment is arranged to hold a respective specimen therein for illumination from below. Each of the compartments 98–112 have associated therewith a transmissive window 114. Each window 114 is defined by a respective oval opening in the intermediate plate 96 and the transparent portions of the upper and lower plates within the bounds of that opening.

The light transmissive windows 114 are equidistantly spaced from one another and with the longitudinal axis of each being radially aligned with a respective circular specimen holding compartment. As should thus be appreciated whenever any specimen holding compartment 98–112 is aligned with the aperture in the microscope stage, an associated aligned window 114 in the specimen holding wheel 94 will be located over the light gathering end 52 of the light transmissive rod 32. Accordingly, ambient light from above the specimen holder will reach the rod unimpeded for illuminating the specimen holding compartment from below.

It should be pointed out at this juncture that the shape and number of the specimen holding compartments of any specimen-holding wheel of this invention is purely a matter of design. Thus, other arrangements than the two specimen holding wheels shown and described herein are contemplated. For example, a specimen holding wheel can be constructed having plural rectangular compartments for holding a conventional microscope slides therein. In such an arrangement the compartments are preferably located as close to the outside of the wheel as possible.

In any embodiment of the specimen holders of this invention, support means are provided to ensure that the specimen holding wheel is maintained parallel to the microscope stage and at a desired height with respect thereto, irrespective of any rough handling that the assembly may receive from the users thereof. The support means basically comprises a pair of shock absorbing supports. One of the supports is in the form of an upstanding wall 116 (FIG. 4) having a shock absorbing pad 118 thereon. The wall 116 is fixedly mounted on the base of the display stand (to be described later) diametrically opposite the microscope. The other support comprises another shock absorbing pad 118 mounted on the microscope stage. Each pad includes an adhesive undersurface for fixedly securing the pad in place. The pads are located at the same height with respect to each other so that they engage the undersurface of the bottom plate 62 of the specimen holding wheel, irrespective of the rotary position of the wheel. Thus, should a downward force be applied to the wheel at any position thereon the wheel will be maintained in its desired orientation and spacing with respect to the microscope.

Referring now to FIGS. 1 and 3 it can be seen that the display stand 26 basically comprises a base or stand 120 and a display panel 122. The stand 120 is an elongated planar member and includes a linear edge 124 and an oppositely located flange 126 having a linear edge 128. The stand 120 is arranged to be disposed on any horizontal support surface, e.g., a desk, table, or the like, so that its edges 124 and 128 are on that surface, whereupon the stand is angled upward.

As mentioned earlier the specimen wheel is mounted on the upstanding post or spindle 84. That post is in turn mounted on the stand 120. The mounting of the post on the stand can be effected in any suitable manner, e.g., an adhesive, a screw and associated washer (not shown), etc.

The microscope is secured to the angularly extending stand 120 via a pair of screws 130 extending through respective elongated slots 142 in the stand and into respective threaded openings or bores 144 the legs of the microscope's base. The slots 142 extend parallel to the longitudinal axis of each leg section 36 of the microscope. Plural washers 132, e.g., Teflon, are interposed between each screw head and the stand. With this arrangement the microscope can be slid either toward or away from the specimen-holding wheel to precisely adjust it with respect thereto. Once the desired position is attained the nuts are tightened to secure the microscope in place at that position. Alternatively, elongated slots (not shown) can be provided extending through each horizontal leg section 36 parallel to the longitudinal axis of that leg section, and respective bolts (not shown) extended through each of the slots and through an associated hole in the base. In such an alternative construction respective nuts (not shown) are screwed onto each bolt to tightly hold the microscope in place once its position with respect to the specimen holding wheel has been established, as desired.

The display panel 122 basically comprises a vertically oriented planar member 134 fixedly secured, via rivets 136, to the flange 124 of the stand 120 so that it extends vertically with respect to the stand. The panel 122 is preferably formed of a transparent material, e.g., acrylic, and is folded over itself to form a thin space 138 for frictionally receiving a card 140 therein. The card may include any type of indicia thereon, e.g., point-of-sale advertising or promotional material, instructions on how to use the microscope, lesson plans, experiments to be conducted, text and/or photographs and/or graphics identifying or describing the specimens to be viewed, or any other textual and/or graphic material.

As should be appreciated from the foregoing the unique qualities of the microscope, e.g., its use of ambient, relective, and transmitted light, render it eminently suitable for use as an educational device for young persons, particularly, when coupled with an easy-to-use, tamper resistant, pre-loaded specimen holder. Most prior art devices are primarily directed at clinical or research screening of glass slides, and not for educational purposes. The effective teaching of science to children, requires not only the examination of standard specimens on slides (as is typically the case), but also the examination of ordinary objects of various sizes and shapes. The use of self-contained "cassettes" or wheels, as provided by the subject invention, enables the student and/or teacher to quickly and easily interchange them to provide a wide viewing experience. For example, one wheel or cassette can be devoted to a specific subject, like sand, another to fabrics, a third to conventional glass-slide mounted specimens, etc.

Moreover the invention also has particularly suitable as a sales aid. In this regard it allows a novice easy access to viewing specimens without sales assistance. It is self-promoting for either the microscope or the entire assembly.

Further still, the invention can serve as an excellent science center exhibit, since it is extremely easy to use, low in cost, low in maintenance, and requires very little room.

Without further elaboration the foregoing will so fully illustrate my invention that others may, by applying current or future knowledge, adopt the same for use under various conditions of service.

I claim:

1. A microscope assembly comprising a microscope and a specimen holder, said microscope comprising an optical tube, a stage having an aperture therein, and a light transmissive rod having an ambient light gathering end portion located below said stage and arranged to receive ambient light and convey it through said aperture to said optical tube, said specimen holder comprising a movable member having plural specimen holding portions and at least one light transmissive window associated with said specimen holding portions, said holder being located adjacent said microscope and arranged to have selected ones of said specimen holding portions disposed over said aperture and with said at least one window in said holder enabling ambient light from above said holder to pass therethrough to said ambient light gathering end of said light transmissive rod.

2. The assembly of claim 1 wherein said holder includes plural windows.

3. The assembly of claim 2 wherein each of said windows is associated with a respective one of said specimen holding portions.

4. The assembly of claim 1 wherein said specimen holder is a rotatable member.

5. The assembly of claim 1 wherein said ambient light gathering portion of said light transmissive rod is sanded to produce a somewhat roughened surface.

6. The assembly of claim 1 additionally comprising a base member upon which said microscope and said specimen holder are mounted, said base member having an upstanding display portion for displaying visible thereon.

7. The assembly of claim 6 wherein said indicia is provided on a card releasably secured to said upstanding display portion.

8. A microscope assembly comprising a microscope and a specimen holder, said microscope comprising an optical tube, a stage having an aperture therein, and a light transmissive rod having an ambient light gathering end portion located below said stage and arranged to receive ambient light and convey it through said aperture to said optical tube, said specimen holder comprising a rotatable member having plural specimen holding portions and at least one light transmissive window associated with said specimen holding portions, said specimen holder being located adjacent said microscope and arranged to have selected ones of said specimen holding portions disposed over said aperture and with said at least one window in said holder enabling ambient light from above said holder to pass therethrough to said ambient light gathering end of said light transmissive rod, wherein said rotatable member is a wheel having a transparent upper plate, a transparent lower plate, and an intermediate plate, said intermediate plate having at least one opening therein to define a sealed specimen holding compartment, and at least another opening therein to define said at least one window.

9. A microscope assembly comprising a microscope and a specimen holder, said microscope comprising an optical tube, a stage having an aperture therein, and a light transmissive rod having an ambient light gathering end portion located below said stage and arranged to receive ambient light and convey it through said aperture to said optical tube, said specimen holder comprising (i) a rotatable member having plural specimen holding portions and at least one light transmissive window associated with said specimen holding portions, said specimen holder being located adjacent said microscope and arranged to have selected ones of said specimen holding portions disposed over said aperture and with said at least one window in said holder enabling ambient light from above said holder to pass therethrough to said ambient light gathering end of said light transmissive rod, and (ii) support means for supporting plural peripheral portions of said rotatable member at spaced locations, one of said locations being located adjacent said microscope stage and another of said locations being located remote from said microscope stage.

10. The assembly of claim 9 wherein said support means comprises respective shock absorbing pads.

11. The assembly of claim 10 wherein one of said shock absorbing pads is mounted on said microscope stage adjacent said aperture and another of said shock absorbing pads is mounted on an upstanding support member at the same elevation as said shock absorbing pad on said microscope stage.

12. A microscope assembly comprising a microscope and a specimen holder, said microscope comprising an optical tube and a stage, said specimen holder comprising a movable member having plural specimen holding portions, said specimen holder comprising a movable member having plural specimen holding portions arranged to be selectably positioned over said stage, said specimen holder comprises support means for supporting plural peripheral portions of said movable member at spaced locations, one of said locations being located adjacent said microscope stage and another of said locations being located remote from said microscope stage, wherein said support means comprises respective shock absorbing pads.

13. The assembly of claim 12 wherein one of said shock absorbing pads is mounted on said microscope stage and another of said shock absorbing pads is mounted on an upstanding support member at the same elevation as said shock absorbing support pad on said microscope stage.

14. The assembly of claim 12 wherein said specimen holder is a rotatable member.

15. The assembly of claim 12 additionally comprising a base member upon which said microscope and said specimen holder are mounted, said base member having an upstanding display portion for displaying indicia thereon.

16. The assembly of claim 15 wherein said indicia is provided on a card releasably secured to said upstanding display portion.

17. A microscope assembly comprising a microscope and a specimen holder, said microscope comprising an optical tube and a stage, said specimen holder comprising (i) a rotatable member having plural specimen holding portions arranged to be selectably positioned over said stage, and (ii) support means for supporting plural peripheral portions of said movable member at spaced locations, one of said locations being located adjacent said microscope stage and another of said locations being located remote from said microscope stage, wherein said rotatable member is a wheel having an upper plate and a lower plate, said lower plate being arranged to support plural specimens thereon at spaced locations adjacent the periphery thereof.

18. A microscope assembly comprising a microscope, a specimen holder and a display stand, said microscope comprising an optical tube and a stage, said specimen holder comprising (i) a movable member having plural specimen holding portions arranged to be selectably positioned over said stage and (ii) a rotatable wheel having an upper plate and a lower plate, said lower plate being arranged to support plural specimens thereon at spaced locations adjacent the periphery thereof, wherein said display stand comprises a base member upon which said microscope and said specimen holder are mounted, said base member having an upstanding display portion for displaying indicia thereon.

19. A microscope assembly comprising a microscope, a specimen holder and a display stand, said microscope comprising an optical tube and a stage, said specimen holder comprising (i) a movable member having plural specimen holding portions arranged to be selectably positioned over said stage and (ii) support means for supporting plural peripheral portions of said rotatable member at spaced locations, one of said locations being located adjacent said microscope stage and another of said locations being located remote from said microscope stage, wherein said display stand comprises a base member upon which said microscope and said specimen holder are mounted, said base member having an upstanding display portion for displaying indicia thereon.

20. The assembly of claim 19 wherein said support means comprises respective shock absorbing pads.

21. The assembly of claim 20 wherein one of said shock absorbing pads is mounted on said microscope stage and another of said shock absorbing pads is mounted on an upstanding support member at the same elevation as said shock absorbing support pad on said microscope stage.

* * * * *